United States Patent
Park (10) Patent No.: US 11,473,443 B2
(45) Date of Patent: Oct. 18, 2022

(54) GAS TURBINE

(71) Applicant: DOOSAN ENERBILITY CO., LTD., Changwon-si (KR)

(72) Inventor: In Hyung Park, Seoul (KR)

(*) Notice: Subject to any disclaimer, the term of this patent is extended or adjusted under 35 U.S.C. 154(b) by 229 days.

(21) Appl. No.: 16/687,977

(22) Filed: Nov. 19, 2019

(65) Prior Publication Data

US 2020/0157969 A1 May 21, 2020

(30) Foreign Application Priority Data

Nov. 20, 2018 (KR) .......................... 10-2018-0143328

(51) Int. Cl.
| | |
|---|---|
| *F01D 25/00* | (2006.01) |
| *B08B 9/093* | (2006.01) |
| *F02C 7/00* | (2006.01) |
| *B08B 3/02* | (2006.01) |
| *F01D 25/28* | (2006.01) |

(52) U.S. Cl.
CPC .............. *F01D 25/002* (2013.01); *B08B 3/02* (2013.01); *B08B 9/093* (2013.01); *F01D 25/00* (2013.01); *F01D 25/285* (2013.01); *F02C 7/00* (2013.01); *F05D 2260/532* (2013.01); *F05D 2260/57* (2013.01)

(58) Field of Classification Search
CPC . B08B 9/093; B08B 3/02; F01D 25/00; F01D 25/002; F01D 25/285; F02C 7/00; F05D 2260/532; F05D 2260/57
See application file for complete search history.

(56) References Cited

U.S. PATENT DOCUMENTS

| | | | |
|---|---|---|---|
| 7,712,301 B1 | 5/2010 | Wagner | |
| 2003/0015603 A1* | 1/2003 | Schreur | B05B 3/0445 239/263.3 |
| 2005/0008474 A1* | 1/2005 | Stalder | B05B 7/0075 415/116 |
| 2006/0243308 A1* | 11/2006 | Asplund | F04D 29/705 134/22.12 |

(Continued)

FOREIGN PATENT DOCUMENTS

| | | |
|---|---|---|
| CN | 101712017 A | 5/2010 |
| CN | 108501534 A | 9/2018 |

(Continued)

*Primary Examiner* — Benjamin L Osterhout
(74) *Attorney, Agent, or Firm* — Harvest IP Law, LLP (57) ABSTRACT

A gas turbine includes a rotational body including a tie rod, a plurality of rotor disks arranged in an axial direction of the tie rod, and a plurality of blades radially arranged on an outer periphery of each rotor disk; a stationary body surrounding the rotational body and defining a working fluid flow space between opposing surfaces of the rotational and stationary bodies, the stationary body including a casing accommodating the rotational body and a plurality of vanes and diaphragms arranged on an inner surface of the casing, the vanes arranged alternately with the blades; and a compressor cleaner disposed at a plurality of compressor positions in the stationary body to spray a cleaning fluid into the working fluid flow space. The compressor positions are separated from each other in the axial direction, and the cleaning fluid is spayed at low pressure to enhance cleaning efficiency while protecting compressor components.

19 Claims, 8 Drawing Sheets

(56) References Cited

U.S. PATENT DOCUMENTS

| | | | |
|---|---|---|---|
| 2007/0000528 A1* | 1/2007 | Asplund | B08B 9/00 134/169 R |
| 2008/0078422 A1* | 4/2008 | Wagner | F01D 25/002 134/198 |
| 2008/0087301 A1* | 4/2008 | Lee | B08B 9/00 134/198 |
| 2008/0149141 A1* | 6/2008 | Sales | B05B 7/0093 134/198 |
| 2010/0200023 A1* | 8/2010 | Giljohann | F01D 25/002 134/198 |
| 2010/0212703 A1* | 8/2010 | de la Bruere-Terreault | F01D 25/002 134/166 R |
| 2011/0008151 A1* | 1/2011 | Heyes | F02B 39/16 415/121.3 |
| 2011/0088723 A1* | 4/2011 | Jensen | F03D 80/50 134/172 |
| 2012/0279523 A1* | 11/2012 | de la Bruere-Terreault | F01D 25/002 134/23 |
| 2013/0104934 A1* | 5/2013 | Tadayon | F01D 25/002 134/10 |
| 2014/0144151 A1* | 5/2014 | Bifulco | F02C 9/00 29/888.011 |
| 2014/0208762 A1* | 7/2014 | Lockyer | F01D 25/002 60/772 |
| 2015/0354404 A1* | 12/2015 | Ekanayake | C11D 3/162 134/102.1 |
| 2016/0090859 A1* | 3/2016 | Aggas | F02C 7/047 60/785 |
| 2016/0273381 A1* | 9/2016 | Morriello | F04D 29/705 |
| 2017/0198635 A1* | 7/2017 | Subbarao | F01D 25/002 |
| 2018/0320594 A1* | 11/2018 | Merchant | F04D 29/705 |
| 2019/0292938 A1* | 9/2019 | Wang | F01D 25/00 |
| 2020/0016633 A1* | 1/2020 | Wang | B08B 9/0321 |
| 2020/0040763 A1* | 2/2020 | Wang | B08B 9/00 |

FOREIGN PATENT DOCUMENTS

| | | |
|---|---|---|
| JP | 2011-179503 A | 9/2011 |
| JP | 2016-196838 A | 11/2016 |
| JP | 2016196838 A | 11/2016 |
| KR | 10-1166315 B | 7/2012 |

* cited by examiner

GAS TURBINE

CROSS-REFERENCE TO RELATED APPLICATION(S)

This application claims priority to Korean Patent Application No. 10-2018-0143328, filed on Nov. 20, 2018, the disclosure of which is incorporated herein by reference in its entirety.

BACKGROUND OF THE INVENTION

Field of the Invention

Exemplary embodiments of the present disclosure relate to a gas turbine, and more particularly, to a gas turbine that includes cleaning fluid injection nozzles arranged at a plurality of positions to spray a cleaning fluid at low pressure enabling uniform and efficient cleaning the gas turbine while protecting internal components.

Description of the Related Art

Generally, a turbine is a power generating apparatus which converts the thermal energy of a fluid such as gas or steam into a rotating force that is mechanical energy. The turbine includes a rotor provided with a plurality of buckets arranged to axially rotate the rotor by the force of the fluid flowing through the bucket arrangement, and a casing provided with a plurality of fixed diaphragms surrounding the rotor.

A gas turbine includes a compressor section, a combustor section, and a turbine section. When the compressor rotates, external air is drawn into and compressed in the compressor. The compressed air is transmitted to the combustor, where the compressed air is mixed with fuel for combustion. High-temperature, high-pressure gas generated from the combustor passes through the turbine section and rotates the rotor of the turbine, thus driving a generator.

During the power-down or periodic maintenance of the gas turbine after use, it is necessary to clean and manage the inside of the gas turbine for subsequent smooth use.

SUMMARY OF THE INVENTION

It is an object of the present disclosure to provide a gas turbine that includes cleaning fluid injection nozzles arranged at a plurality of positions to spray a cleaning fluid at low pressure to enable uniform and efficient cleaning of the gas turbine while protecting compressor components.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an aspect of the present disclosure, a gas turbine may include a rotational body including a tie rod, a plurality of rotor disks arranged in an axial direction of the tie rod, and a plurality of blades radially arranged on an outer periphery of each of the rotor disks; a stationary body surrounding the rotational body and defining a working fluid flow space between opposing surfaces of the rotational body and the stationary body, the stationary body including a casing for accommodating the rotational body and a plurality of vanes and diaphragms arranged on an inner surface of the casing, the vanes arranged alternately with the blades; and a compressor cleaner disposed at a plurality of compressor positions in the stationary body and configured to spray a cleaning fluid into the working fluid flow space, the plurality of compressor positions separated from each other in the axial direction.

The compressor cleaner may include a plurality of sprayers communicating with a cleaning fluid supply source disposed externally with respect to the casing, each sprayer of the plurality of sprayers disposed at one of the plurality of compressor positions to spray the cleaning fluid in a downstream direction of the working fluid flow space from the one compressor position.

The stationary body may further include a center frame and a strut connected between the center frame and the inner surface of the casing, and the plurality of compressor positions may include a first position located on one of the center frame and the strut.

The plurality of sprayers may include a first sprayer disposed at the first position; and a second sprayer disposed on the inner surface of the casing. The plurality of compressor positions may include a plurality of second positions axially separated from each other to correspond to positions interposed between the plurality of vanes, and the second sprayer may be disposed at the plurality of second positions.

The plurality of sprayers may further include a third sprayer. The plurality of compressor positions may further include a plurality of third positions axially separated from each other to correspond to positions of the plurality of vanes or diaphragms.

The compressor cleaner may further include a controller configured to individually control a flow rate of the cleaning fluid supplied to the first, second, and third sprayers and enable entire or local cleaning of the working fluid flow space; and a hydraulic pressure regulator configured to individually measure and regulate a hydraulic pressure of the cleaning fluid supplied to the first, second, and third sprayers.

The compressor cleaner may include an injection nozzle disposed in a through-hole formed in the inner surface of the casing and having an injection port directed in the downstream direction; a cleaning fluid passage communicating with the cleaning fluid supply source to supply the cleaning fluid to the injection nozzle; and a cover slider disposed on the inner surface of the casing and configured to move a slidable cover disposed on the inner surface of the casing, the slidable cover moved to cover the injection port in order to open and close the injection nozzle. The cover slider may include a rotary motor disposed in the casing; a guide screw connected to a rotary shaft of the rotary motor; and a moving block having gear teeth to engage with the guide screw, and the slidable cover may be connected to the moving block and configured to open and close the injection nozzle according to the movement of the moving block. The compressor cleaner may further include a nozzle seal ring disposed between an inner circumference of the through-hole and an outer circumference of the injection nozzle. A diffusion filter may be provided which includes a plurality of diffusion windows disposed at the injection port of the injection nozzle to guide a diffusion direction of the cleaning fluid, and the injection port may have an increasing flow cross-sectional area so that the cleaning fluid is diffused and sprayed into the working fluid flow space. A rotator disposed in the casing and connected to the injection nozzle may be provided, wherein the rotator is configured to rotate the injection nozzle within a predetermined angle range in order to control an injection range of the cleaning fluid sprayed into the working fluid flow space. The rotator may include a bevel gear box disposed in the casing and connected to an end of the injection nozzle; and a rotation motor disposed in the casing and connected to the bevel gear box.

The compressor cleaner may include an injection nozzle disposed in a through-hole formed in the inner surface of the casing and having an injection port directed in the downstream direction; a cleaning fluid passage communicating with the cleaning fluid supply source to supply the cleaning fluid to the injection nozzle; and an vertical elevator disposed in the casing and connected to the injection nozzle, the vertical elevator being configured to move the injection nozzle perpendicularly with respect to the inner surface of the casing. Nozzle covers may be disposed at both ends of the injection nozzle and have a size corresponding to an inner peripheral surface of the through-hole, and a nozzle seal ring may be disposed between an inner surface of the through-hole and an outer surface of each of the nozzle covers. The vertical elevator may include a hydraulic cylinder disposed in the casing and connected to the injection nozzle. In this case, the diffusion filter and the rotator may also be provided as above. Here, the vertical elevator may include an elevation block in which the bevel gear box and the rotation motor are disposed; an elevation motor disposed in the casing; an elevation screw connected to a rotary shaft of the elevation motor; and a link arm that is disposed at an end of the elevation block and has gear teeth to engage with the elevation screw.

In accordance with another aspect of the present disclosure, there is provided a cleaning structure for a gas turbine including a rotational body consistent with the above and a stationary body consistent with the above. The cleaning structure may include a plurality of sprayers respectively disposed at a plurality of compressor positions in the stationary body and configured to spray a cleaning fluid into the working fluid flow space, the plurality of compressor positions separated from each other in the axial direction. Each sprayer of the plurality of sprayers may be disposed at one of the plurality of compressor positions to spray the cleaning fluid in a downstream direction of the working fluid flow space from the one compressor position.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Hereinafter, a gas turbine according to exemplary embodiments of the present disclosure will be described in detail with reference to the accompanying drawings.

First, the configuration of an exemplary gas turbine will be generally described.

Figure 1:
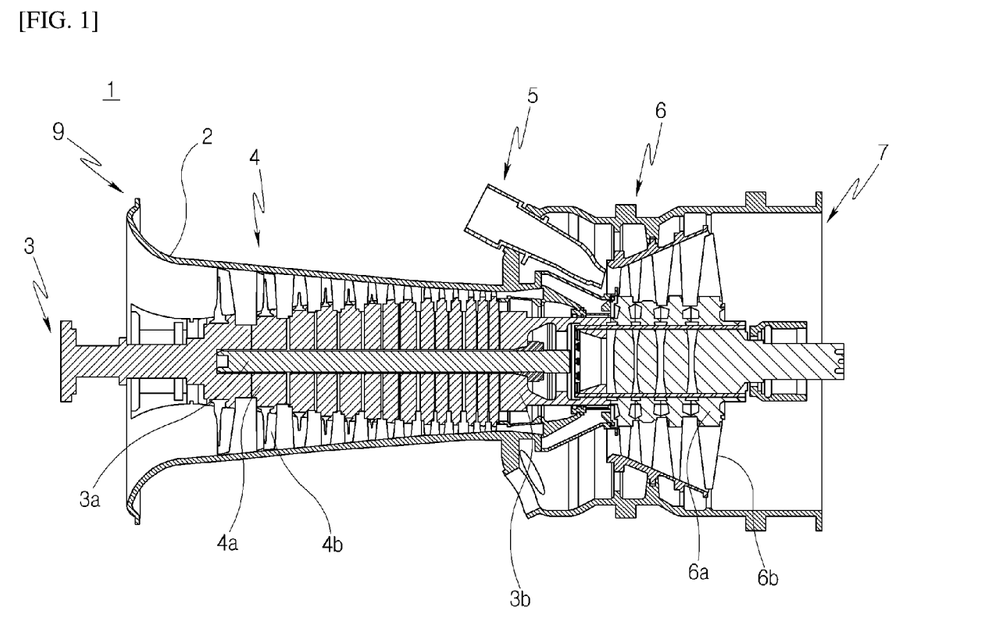
FIG. 1 is a cross-sectional view of a gas turbine to which may be applied a cleaning structure in accordance with the present disclosure.

Referring to FIG. 1, a gas turbine 1 may basically include a casing 2 which forms an appearance of the gas turbine 1, a compressor section 4 configured to compress air, a combustor section 5 configured to combust the compressed air, a turbine section 6 configured to generate electricity using combustion gas, a diffuser 7 configured to discharge exhaust gas, and a rotational body 3 which includes the compressor section 4 combined with the turbine section 6 by a tie rod 3a to transmit rotating force.

External air is drawn into the compressor section 4 that thermodynamically corresponds to an upstream side of the gas turbine 1. The drawn external air is compressed by adiabatic compression. The compressed air is drawn into the combustor section 5 and mixed with fuel, and the mixture is combusted through a constant pressure combustion process. Combustion gas is drawn into the turbine section 6 corresponding to a downstream side of the gas turbine 1 and is expanded through an adiabatic expansion process. A torque tube 3b for transmitting rotational torque generated from the turbine section 6 to the compressor section 4 is provided between the upstream-side compressor section 4 and the downstream-side turbine section 6.

The compressor section 4 is provided with a plurality (e.g., fourteen) of compressor rotor disks 4a. The compressor rotor disks 4a are coupled by a tie rod 3a such that they are not spaced apart from each other in an axial direction. The compressor rotor disks 4a are arranged along the axial direction of the tie rod 3a. A flange protruding in the axial direction is formed around an outer circumferential portion of each compressor rotor disk 4a and is coupled to a neighboring rotor disk 4a so as to prevent the adjacent rotor disks 4a from rotating relative to each other. A plurality of blades (or "buckets") 4b are radially coupled to an outer circumferential surface of each compressor rotor disk 4a. Each of the blades 4b includes a dovetail (not shown) by which the blade 4b is coupled to the compressor rotor disk 4a. Relative to a rotation of the compressor blades 4b, a plurality of vanes or "nozzles" 2b (FIG. 2) and diaphragms 2b (FIG. 2) may be disposed on an inner circumferential surface of the casing 2 in the compressor section 4.

The tie rod 3a passes through respective central portions of the compressor rotor disks 4a and has a first end coupled to the farthest upstream compressor rotor disk 4a and a second end fixed to the torque tube 3b. The tie rod 3a may be variously configured depending on the structure of the gas turbine, including a single tie rod as shown in FIG. 1, a plurality of tie rods arranged in a circumferential direction, or a combination of these.

The compressor section 4 may be provided with a guide vane or deswirler (not shown) to increase the pressure of fluid entering a combustor inlet and to adjust its angle of flow to a design angle.

The combustor section 5 mixes introduced compressed air with fuel, combusts the fuel mixture to generate high-temperature, high-pressure combustion gas having high energy. Through an isobaric combustion process, the temperature of the combustion gas is increased to a heat resistant limit temperature at which components of the combustor section 5 and the turbine section 6 can endure. The combustor section 5 includes a plurality of combustors arranged as cells around the casing 2.

The combustion gas exiting the combustor section 5 expands in the turbine section 6 to apply driving force and reaction force to an impeller of the turbine section 6, thus generating mechanical energy. Some of the mechanical energy obtained from the turbine section 6 is supplied as energy needed to compress air in the compressor section 4, and the remaining mechanical energy is used to drive a generator and produce electric power. The turbine section 6 is formed of a plurality of stators and a plurality of rotors which are alternately arranged in a turbine casing. The rotors are driven by the combustion gas so as to rotate an output shaft coupled to the generator.

The turbine section 6 includes a plurality of turbine rotor disks 6a, each configured basically the same as the compressor rotor disks 4a. For example, the turbine rotor disk 6a also includes a flange (not shown) provided for coupling with a neighboring turbine rotor disk 6a, and a plurality of turbine blades (or "buckets") 6b which are radially provided and coupled to the turbine rotor disk 6a in a dovetail coupling manner. Relative to a rotation of the turbine blades 6b, a plurality of vanes or "nozzles" (not shown) and diaphragms (not shown) may be disposed on an inner circumferential surface of the casing 2 in the turbine section 6.

In the gas turbine having the above configuration, introduced air is compressed in the compressor section 4, combusted in the combustor section 5, transferred to the turbine section 6 to generate electricity, and then discharged to the atmosphere through the diffuser 7. Here, rotational components of the gas turbine include the torque tube 3b, the compressor rotor disks 4a, the compressor blades 4b, the turbine rotor disks 6a, the turbine blades 6b, and the tie rod 3a, which together with similarly provided components may be collectively referred to as the rotational body 3, or the rotor of the gas turbine. Meanwhile, non-rotational components include the casing 2, the vanes (not shown), the diaphragm (not shown), which together with similarly provided components may be collectively referred to as a stationary body 9, or the stator of the gas turbine. The stationary body 9 surrounds the rotational body 3 and thus defines a working fluid flow space between opposing surfaces of the rotational body 3 and the stationary body 9.

A cleaning structure of a gas turbine according to the present disclosure may be applied to the above-described gas turbine.

In cleaning the inside of such a gas turbine during a time of power-down, for example, to perform maintenance of the gas turbine after some period of time, it should be appreciated that the compressor section 4 typically includes a strut connected between the casing 2 and a center frame 8a (FIG. 2) provided at an inlet end of the compressor section 4. Thus, the strut is disposed at the inlet end into which a working fluid is introduced in the compressor section 4.

The compressor section 4 may be cleaned using a cleaning fluid sprayed into the casing 2 at high pressure. Here, an injection nozzle (not shown) may be provided for spraying a cleaning fluid downstream into the casing 2 from a position on the strut. However, such an injection nozzle disposed only at the inlet end of the compressor section 4 presents difficulties in realizing uniform cleaning throughout the compressor section 4. Also, the cleaning fluid must be sprayed at high pressure to reach deep into the compressor section 4, such that surface damage of compressor components, particularly near the injection nozzle, may result.

Hereinafter, a cleaning structure of a gas turbine in accordance with exemplary embodiments of the present disclosure will be described with reference to FIG. 2.

Figure 2:
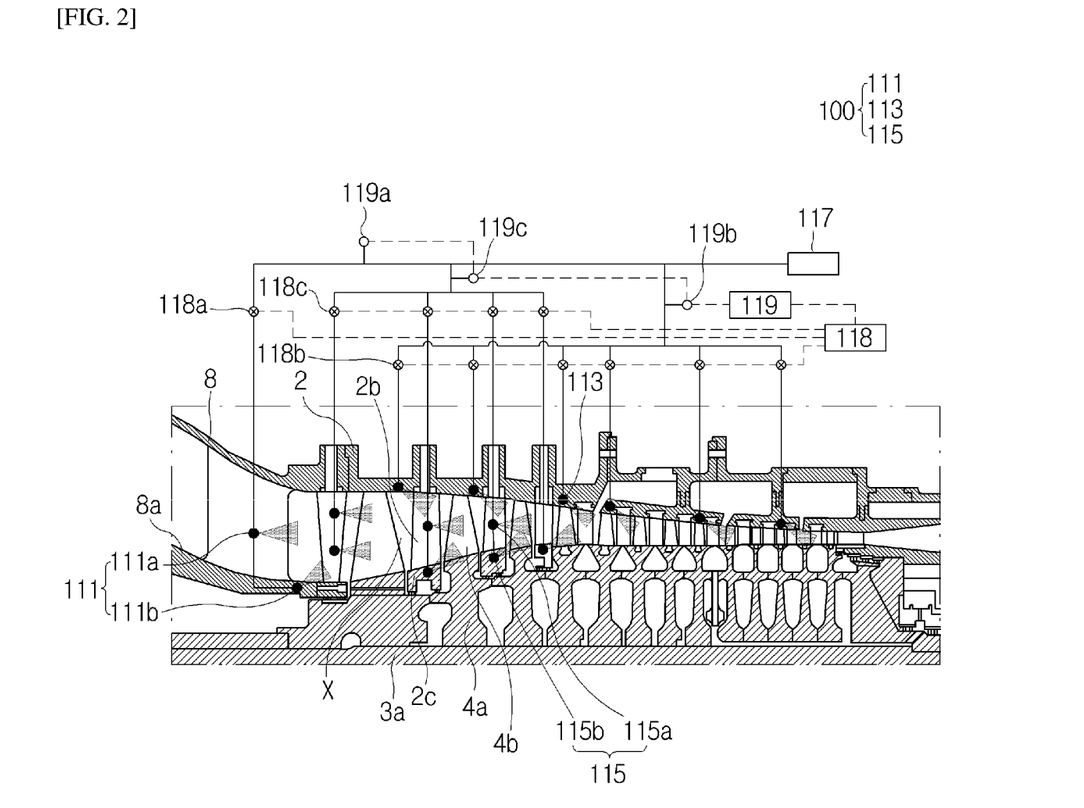
FIG. 2 is a cross-sectional view of a compressor section the gas turbine of FIG. 1, including a diagram of a cleaning structure of a gas turbine according to the present disclosure.

Referring to FIG. 2, the gas turbine of the present invention may include a rotational body 3, a stationary body 9, and a compressor cleaner 100. A plurality of vanes 2b and diaphragms 2c are circumferentially arranged on an inner surface of the casing 2 to comprise the stationary body 9, which may further include a strut 8 connected to an inner surface of the casing 2. Meanwhile, the rotational body 3 is accommodated in the casing 2 and is comprised of a plurality of rotor disks 4a installed on a tie rod 3a, each of which has an outer periphery on which a plurality of blades 4b are radially arranged. In the compressor section 4, the vanes 2b and the blades 4b are alternately arranged in a multistage manner.

The compressor cleaner 100 may be disposed at a plurality of positions in the stationary body 9 to clean the inside of the compressor section 4. More particularly, the compressor cleaner is configured to clean a working fluid flow space X, defined by opposing surfaces of the rotational body 3 and the stationary body 9, by spraying a cleaning fluid into the space X.

The compressor cleaner 100 may include a first sprayer 111, a second sprayer 113, and a third sprayer 115.

The first sprayer 111 may be disposed on the strut 8 (111a) or the center frame 8a (111b) disposed at the inlet end of the compressor section, may be connected to an external cleaning fluid supply source 117, and may spray a cleaning fluid in the flow direction of the working fluid.

The second sprayer 113 may be disposed on the inner surface of the casing 2, may be connected to the external cleaning fluid supply source 117, and may spray a cleaning fluid in the flow direction of the working fluid. The second sprayer 113 may be disposed not only in the compressor section but also in the turbine section, and may consist of a plurality of second sprayers arranged in the longitudinal direction of the compressor section and turbine section.

The third sprayer 115 may be disposed on each of the vanes 2b (115a) or diaphragms 2c (115b), may be connected to the external cleaning fluid supply source 117, and may spray a cleaning fluid in the flow direction of the working fluid. The third sprayer 115 may consist of a plurality of third sprayers arranged on the vanes 2b or the diaphragms 2c. When the third sprayers are disposed at both sides of each of the vanes 2b or diaphragms 2c, the injection directions of the cleaning fluid may be arranged to face the center.

The first, second, and third sprayers 111, 113, and 115 may be individually controlled by a controller 118, which may include a programmable computer or computer processor provided with an operator interface. In particular, the controller 118 is configured to individually control first, second, and third flow control valves 118a, 118b, and 118c. The controller 118 may be further configured to control a hydraulic pressure regulator 119 including first, second, and third hydraulic pressure regulators 119a, 119b, and 119c. On the other hand, the hydraulic pressure regulator 119 may itself include a programmable computer or computer processor provided with an operator interface enabling control of the first, second, and third hydraulic pressure regulators 119a, 119b, and 119c separately from the controller 118.

The controller 118 may be further configured to control the cleaning fluid supply source 117 as well as a plurality of drive members.

To clean the inside of the gas turbine, the cleaning fluid supply source 117 sends the cleaning fluid to the first, second, and third sprayers 111, 113, and 115 for injection. To additionally perform a second cleaning operation in a specific region after the completion of the first cleaning, the first, second, and third flow control valves 118a, 118b, and 118c may be individually controlled to locally select the portion to be cleaned. That is, the controller 118 individually controls the flow rate of the cleaning fluid supplied to the first, second, and third sprayers 111, 113, and 115 to enable entire or local cleaning of the working fluid flow space X.

To further clean the inlet end of the compressor section, the first flow control valve 118a is opened and the second and third flow control valves 118b and 118c are closed, thereby allowing the cleaning fluid to be sprayed only from the first sprayer 111.

To further clean the inside of the compressor section, the first flow control valve 118a is closed and the second and third flow control valves 118b and 118c are opened, thereby allowing the cleaning fluid to be sprayed only from the second and third sprayers 113 and 115.

As such, local cleaning can be performed manually or according to the programming of the controller 118. Therefore, compared to a cleaning structure in which the cleaning fluid is sprayed only from the strut 8, the present disclosure can achieve a reduction in cleaning fluid and an increase in cleaning efficiency in the additional operation.

The present disclosure may include a hydraulic pressure regulator 119 disposed to individually measure and regulate the hydraulic pressure of the cleaning fluid supplied to the first, second, and third sprayers 111, 113, and 115.

To spray the cleaning fluid at low pressure at a specific point in the working fluid flow space X, the hydraulic pressure may be measured at each point through the hydraulic pressure regulator 119 in order to locally regulate the injection hydraulic pressure of the cleaning fluid.

For example, to lower the hydraulic pressure at the inlet end of the compressor section, the first hydraulic pressure regulator 119a is controlled to lower the delivery pressure of the cleaning fluid.

To spray the cleaning fluid at low pressure in the compressor section, the second and third hydraulic pressure regulators 119b and 119c are controlled to lower the delivery pressure of the cleaning fluid.

As such, the injection hydraulic pressure of the cleaning fluid can be locally regulated manually or according to the programming of the controller 118. Therefore, the hydraulic pressure regulator 119 can be usefully utilized when it is necessary to spray the cleaning fluid at relatively low pressure due to the wear of and damage to components at a certain point in the working fluid flow space X. This makes it possible to prevent the wear of and damage to components due to the injection of the cleaning fluid, thereby increasing the service life of the components.

Figure 3A:
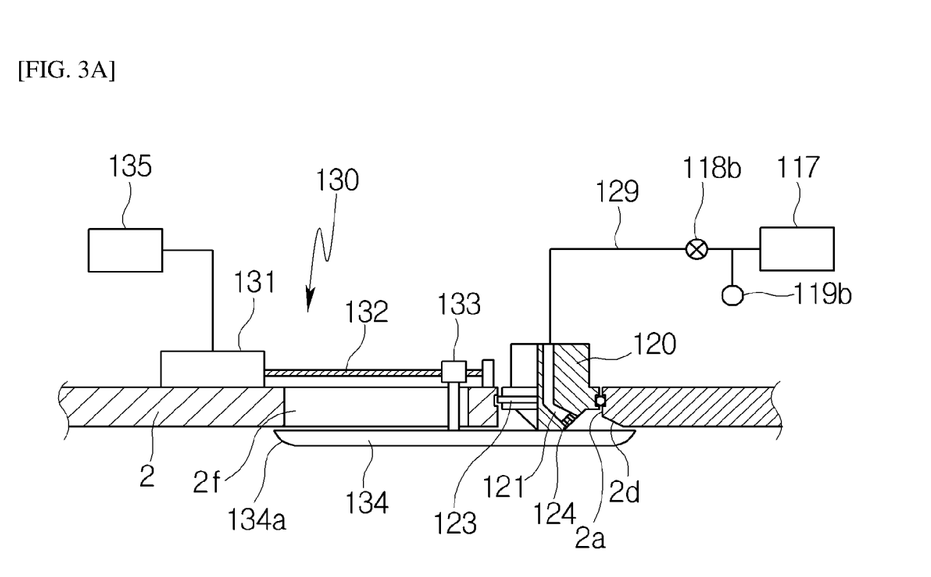
FIG. 3A is a diagram illustrating a first embodiment of a compressor cleaner according to the present disclosure.
Figure 3B:
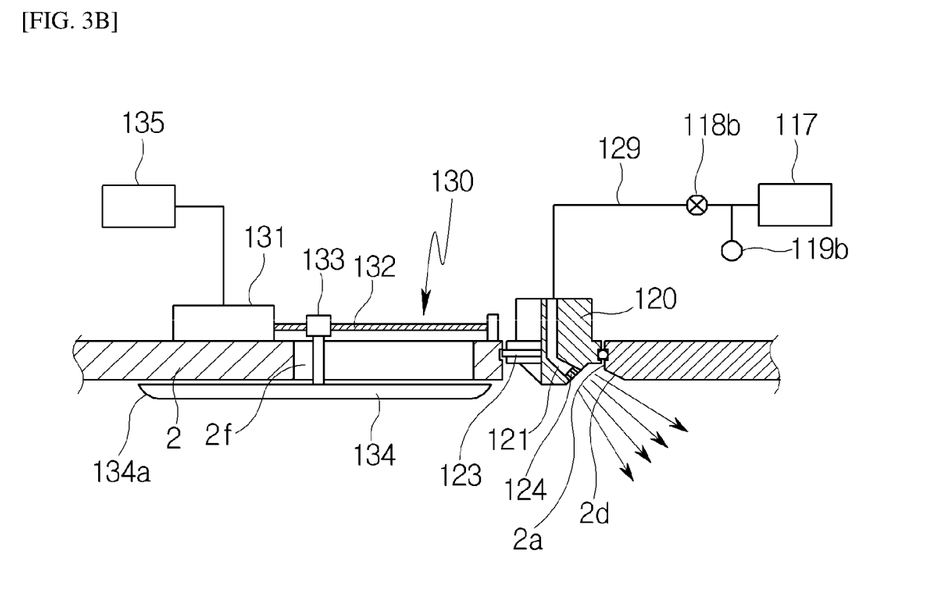
FIG. 3B is a view of FIG. 3A showing a state in which a slidable cover is opened to spray a cleaning fluid.

FIGS. 3A and 3B illustrate a first embodiment of a compressor cleaner 100 according to the present disclosure, where FIG. 3B shows a state in which a slidable cover 134 is opened to permit spraying.

Referring to FIGS. 3A and 3B, the first embodiment of the compressor cleaner 100 according to the present disclosure may include an injection nozzle, a cleaning fluid passage 129, and a cover slider 130.

The injection nozzle 120 may be disposed in a through-hole 2a formed in the inner surface of the casing 2, and have an injection port 121 inclined in the flow direction of the working fluid. The injection port 121 may have an increasing flow cross-sectional area so that the cleaning fluid is diffused and sprayed into the working fluid flow space X. The through-hole 2a may be formed with a cut-out 3d inclined in one direction in consideration of the injection direction of the cleaning fluid. The cut-out 2d may allow the cleaning fluid sprayed from the injection port 121 to be sprayed into the working fluid flow space X without being disturbed at the end of the through-hole 2a.

The cleaning fluid passage 129 may be a pipe connected to the external cleaning fluid supply source 117 to supply the cleaning fluid to the injection nozzle 120. A second flow control valve 118b for controlling the flow rate of the cleaning fluid and a second hydraulic pressure regulator 119b for measuring/regulating the hydraulic pressure of the cleaning fluid may be disposed on the cleaning fluid passage 129.

The cover slider 130 may be disposed on the inner surface of the casing 2 and may open and close the injection nozzle 120 while sliding.

The cover slider 130 may include a rotary motor 131, a guide screw 132, a moving block 133, and the slidable cover 134.

The rotary motor 131 is disposed in the casing 2, and the guide screw 132 is connected to the rotary shaft of the rotary motor 131. The moving block 133 is engaged to the guide screw 132 by gear teeth and connected to the slidable cover 134.

The slidable cover 134 is disposed on the inner surface of the casing 2, and connected to the moving block 133. The slidable cover 134 opens and closes the injection nozzle 120 according to the movement of the moving block 133. The slidable cover 134 may have a curved and inclined outer circumference so as not to interfere with the flow of the working fluid during the operation of the gas turbine. The curved or inclined shape allows the working fluid to smoothly flow on the surface of the slidable cover 134.

In the present disclosure, the compressor cleaner 100 may further include a nozzle seal ring 123 and a diffusion filter 124.

The nozzle seal ring 123 may be disposed between the inner circumference of the through-hole 2a and the outer circumference of the injection nozzle 120. The injection nozzle 120 has a groove formed on the outer circumference thereof, and the nozzle seal ring 123 is mounted into the groove. This is to prevent the cleaning fluid from leaking into the space between the through-hole 2a and the injection nozzle 120 when the cleaning fluid is sprayed.

Of course, although not illustrated in the drawings, sealing may be treated between the slidable cover 134 and the inner surface of the casing 2 so as to prevent the working fluid from leaking into the slidable cover 134 during the operation of the gas turbine.

The diffusion filter 124 may be disposed at the injection port 121 of the injection nozzle 120 and may have a plurality of diffusion windows to guide the diffusion direction of the cleaning fluid. When the cleaning fluid passes through the injection port 121, it passes through the diffusion windows of the diffusion filter 124. Since the injection port 121 itself has an increasing flow cross-sectional area, the cleaning fluid is guided through the diffusion windows arranged in the diffusion direction of the diffusion filter 124 when the cleaning fluid is diffused and sprayed. Thus, the cleaning fluid is sprayed into the working fluid flow space X with more distinctive directionality.

Referring to FIG. 3B, when the rotary motor 131 is driven through a drive member 135, the rotary motor 131 rotates the guide screw 132 to move the moving block 133 through a moving hole 2f. In this case, the slidable cover 134 connected to the moving block 133 opens the through-hole 2a.

Next, the cleaning fluid supply source 117 is operated to set the flow rate and hydraulic pressure of the sprayed cleaning fluid through the second flow control valve 118b and the second hydraulic pressure regulator 119b, respectively. Subsequently, the cleaning fluid is supplied to the injection port 121 of the injection nozzle 120, and diffused and sprayed into the working fluid flow space X. In this case, the diffusion filter 124 allows the cleaning fluid to be diffused with directionality.

Figure 3C:
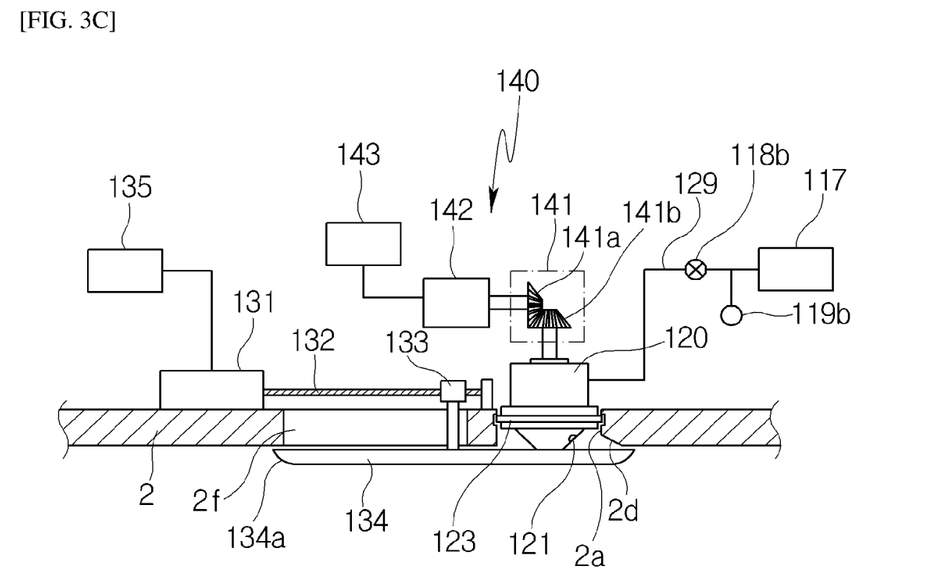
FIG. 3C is a diagram illustrating a second embodiment of a compressor cleaner according to the present disclosure in which a rotator is additionally provided to the first embodiment.

FIG. 3C illustrates a second embodiment of the present disclosure in which a rotator 140 is provided in addition to the structure of FIG. 3A.

Referring to FIG. 3C, the second embodiment of a compressor cleaner 100 according to the present disclosure may further include a rotator 140. The rotator 140 may be disposed in the casing 2 and connected to the injection nozzle 120. The rotator 140 may rotate the injection nozzle 120 within a predetermined angle range.

That is, the rotator 140 may rotate the injection nozzle 120 within a predetermined angle range to enlarge the injection range of the cleaning fluid sprayed into the working fluid flow space X.

The rotator 140 may include a bevel gear box 141 and a rotation motor 142. The bevel gear box 141 may be disposed in the casing 2 and may be connected to the end of the injection nozzle 120 by a second bevel gear 141b. The rotation motor 142 may be disposed in the casing 2 and may be connected to the second bevel gear 141b by a first bevel gear 141a. The first bevel gear 141a is connected to the rotary shaft of the rotation motor 142.

When the rotation motor 142 is driven through a drive member 143, the direction of rotation of the bevel gear box 141 is changed so that the injection nozzle 120 rotates within a predetermined angle range. Here, the predetermined angle range is preferably from 5 to 45 degrees, but the present disclosure is not limited thereto. As the injection nozzle 120 rotates, the injection range of the cleaning fluid sprayed from the injection port 121 is enlarged and the cleaning efficiency is improved.

Figure 4A:
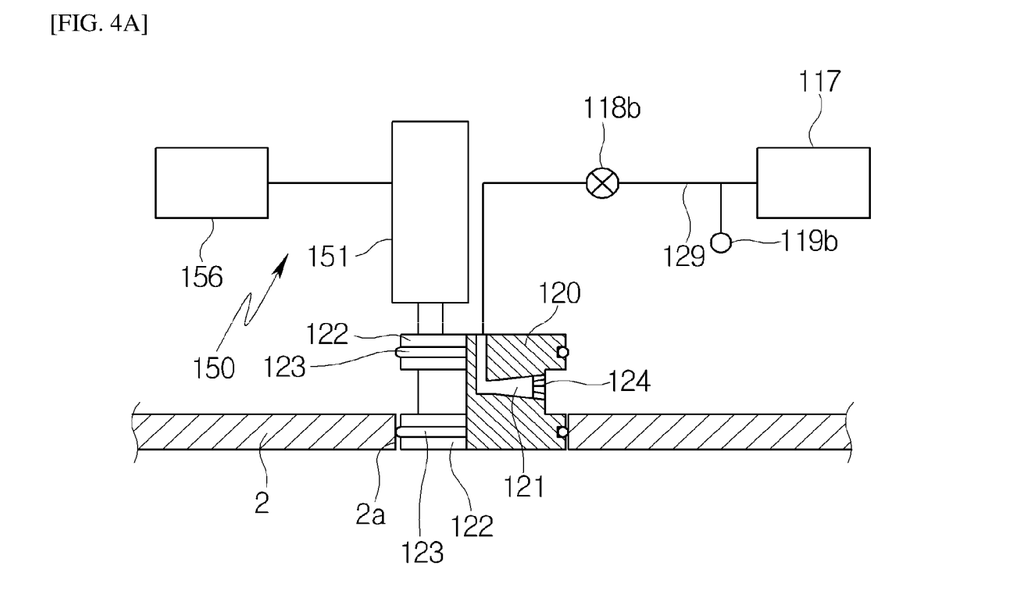
FIG. 4A is a diagram illustrating a third embodiment of a compressor cleaner according to the present disclosure.
Figure 4B:
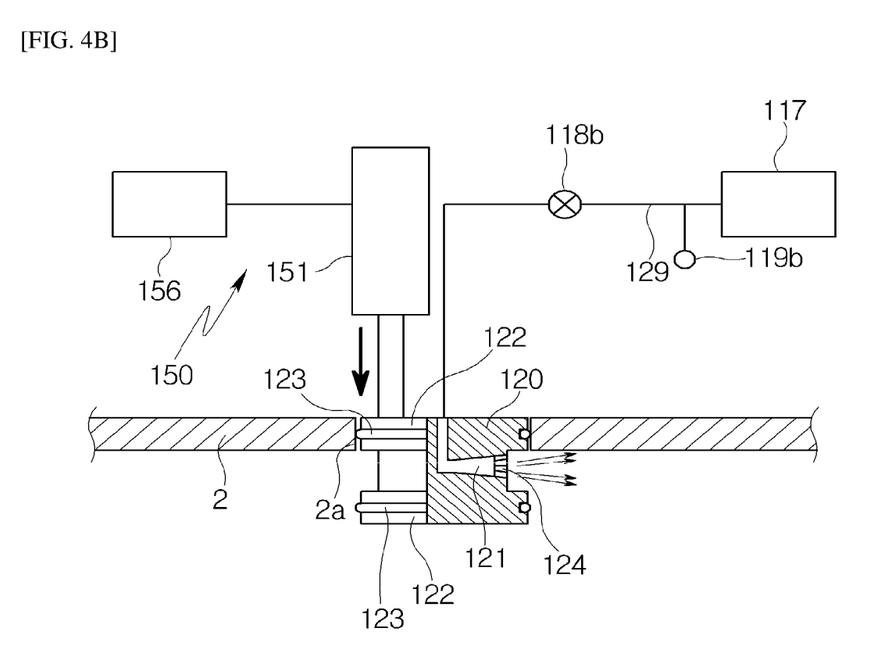
FIG. 4B is a view of FIG. 4A showing a state in which a nozzle cover is opened to spray a cleaning fluid.

FIGS. 4A and 4B illustrate a third embodiment of a compressor cleaner 100 according to the present disclosure, where FIG. 4B shows a state in which a nozzle cover 122 is opened to permit spraying.

Referring to FIGS. 4A and 4B, the third embodiment of the compressor cleaner 100 according to the present disclosure may include an injection nozzle, a cleaning fluid passage 129, and an vertical elevator 150.

The injection nozzle 120 may be disposed in a through-hole 2a formed in the inner surface of the casing 2, and have an injection port 121 inclined in the flow direction of the working fluid. The injection port 121 may have an increasing flow cross-sectional area so that the cleaning fluid is diffused and sprayed into the working fluid flow space X.

Here, a diffusion filter 124 may be disposed at the injection port 121 of the injection nozzle 120 to guide the diffusion direction of the cleaning fluid, and the diffusion filter 124 may have a plurality of diffusion windows. When the cleaning fluid passes through the injection port 121, it passes through the diffusion windows of the diffusion filter 124.

Since the injection port 121 itself has an increasing flow cross-sectional area, the cleaning fluid is guided through the diffusion windows arranged in the diffusion direction of the diffusion filter 124 when the cleaning fluid is diffused and sprayed. Thus, the cleaning fluid is sprayed into the working fluid flow space X with more distinctive directionality.

A pair of nozzle covers 122 are disposed at both ends of the injection nozzle 120 and have a size corresponding to the inner peripheral surface of the through-hole 2a. A nozzle seal ring 123 may be disposed between the inner circumference of the through-hole 2a and the outer circumference of each of the nozzle covers 122, respectively.

The nozzle cover 122 has a groove formed on the outer circumference thereof, and the nozzle seal ring 123 is mounted into the groove. This is to prevent the cleaning fluid from leaking into the space between the through-hole 2a and the injection nozzle 120 when the cleaning fluid is sprayed.

In addition, this is to prevent the working fluid from leaking between the through-hole 2a and the nozzle cover 122 during the operation of the gas turbine.

The cleaning fluid passage 129 may be a pipe connected to the external cleaning fluid supply source 117 to supply the cleaning fluid to the injection nozzle 120. A second flow control valve 118b for controlling the flow rate of the cleaning fluid and a second hydraulic pressure regulator 119b for measuring/regulating the hydraulic pressure of the cleaning fluid may be disposed on the cleaning fluid passage 129.

The vertical elevator 150 may be disposed in the casing 2 and may be connected to the injection nozzle 120. The vertical elevator 150 may vertically move the injection nozzle 120.

In the third embodiment of the present disclosure, the vertical elevator 150 may be a hydraulic cylinder 151. Referring to FIG. 4B, when the hydraulic cylinder 151 is driven through a drive member 156, the injection nozzle 120 connected to the rod of the hydraulic cylinder 151 moves down. In this case, the nozzle seal ring 123 disposed around the nozzle cover 122 is in contact with the inner peripheral surface of the through-hole 2a, thereby maintaining the sealing.

Next, the cleaning fluid supply source 117 is operated to set the flow rate and hydraulic pressure of the sprayed cleaning fluid through the second flow control valve 118b and the second hydraulic pressure regulator 119b, respectively. Subsequently, the cleaning fluid is supplied to the injection port 121 of the injection nozzle 120, and diffused and sprayed into the working fluid flow space X. In this case, the diffusion filter 124 allows the cleaning fluid to be diffused with directionality.

Figure 4C:
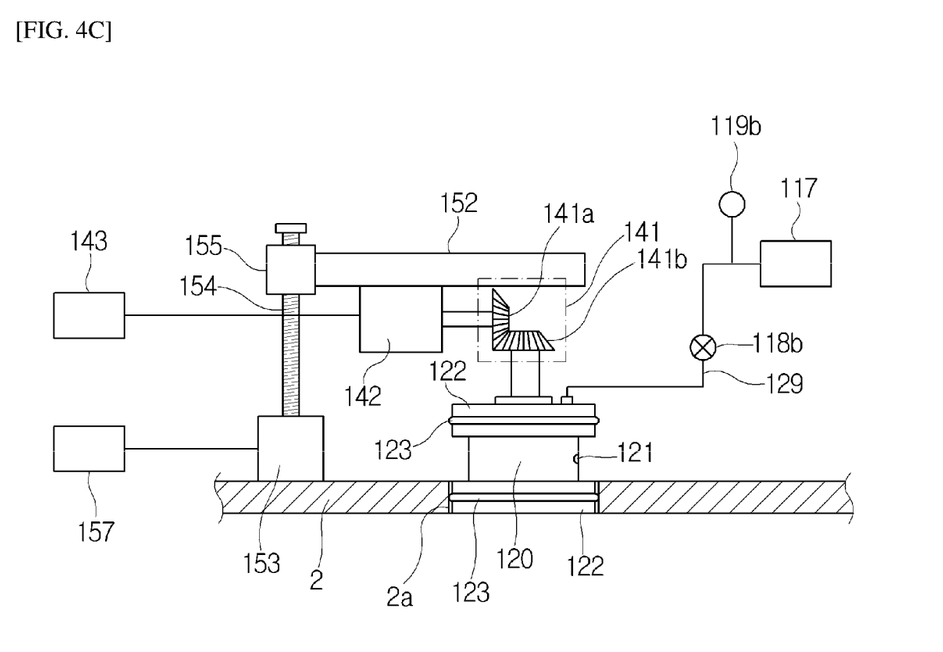
FIG. 4C is a diagram illustrating a fourth embodiment of a compressor cleaner according to the present disclosure in which a rotator is additionally provided to the third embodiment.

FIG. 4C illustrates a fourth embodiment of the present disclosure in which a rotator 140 is provided in addition to the structure of FIG. 4A.

Referring to FIG. 4C, the fourth embodiment of a compressor cleaner 100 according to the present disclosure may further include a rotator 140. The rotator 140 may be disposed in the casing 2 and connected to the injection nozzle 120. The rotator 140 may rotate the injection nozzle 120 within a predetermined angle range.

That is, the rotator 140 may rotate the injection nozzle 120 within a predetermined angle range to enlarge the injection range of the cleaning fluid sprayed into the working fluid flow space X.

The rotator 140 may include a bevel gear box 141 and a rotation motor 142. The bevel gear box 141 may be disposed in the casing 2 and may be connected to the end of the injection nozzle 120 by a second bevel gear 141*b*. The rotation motor 142 may be disposed in the casing 2 and may be connected to the second bevel gear 141*b* by a first bevel gear 141*a*. The first bevel gear 141*a* is connected to the rotary shaft of the rotation motor 142.

When the rotation motor 142 is driven through a drive member 143, the direction of rotation of the bevel gear box 141 is changed so that the injection nozzle 120 rotates within a predetermined angle range. Here, the predetermined angle range is preferably from 5 to 45 degrees, but the present disclosure is not limited thereto.

In the fourth embodiment of the present disclosure, the vertical elevator 150 may be connected to the rotator 140. The vertical elevator 150 may include an elevation block 152, an elevation motor 153, an elevation screw 154, and a link arm 155.

The bevel gear box 141 and the rotation motor 142 may be disposed in the elevation block 152, and the elevation motor 153 may be disposed in the casing 2. The elevation screw 154 is connected to the rotary shaft of the elevation motor 153. The link arm 155 is disposed at the end of the elevation block 152 and engaged to the elevation screw 154 by gear teeth.

When the elevation motor 153 is driven through a drive member 157, the elevation screw 154 rotates so that the link arm 155 moves down. The elevation block 152 connected to the link arm 155 moves down along with the link arm, and the injection port 121 of the injection nozzle 120 is exposed to the working fluid flow space X. In this case, since the outer peripheral surface of the nozzle cover 122 and the inner peripheral surface of the through-hole 2*a* are in contact with each other by the nozzle seal ring 123, the leakage of the cleaning fluid is prevented.

Next, when the rotation motor 142 is driven through a drive member 143, the direction of rotation of the bevel gear box 141 is changed so that the injection nozzle 120 rotates within a predetermined angle range. Here, the predetermined angle range is preferably from 5 to 45 degrees, but the present disclosure is not limited thereto. As the injection nozzle 120 rotates, the injection range of the cleaning fluid sprayed from the injection port 121 is enlarged and the cleaning efficiency is improved.

As is apparent from the above description, since the injection nozzles for spraying a cleaning fluid are arranged at a plurality of positions in the gas turbine of the present disclosure, it is possible to relatively uniformly and efficiently clean the inside of the gas turbine in which a working fluid flows.

Unlike the conventional injection nozzle disposed on the strut, the injection nozzles are arranged at a plurality of positions in the compressor section or turbine section of the gas turbine. Therefore, it is possible to lower the injection pressure and reduce the surface damage of the components.

Since the injection nozzles are opened and closed in a sliding or elevating manner, they do not affect the flow of working fluid during the power generation of the gas turbine.

The present disclosure can control cleaning fluid to be individually sprayed at a plurality of points to enable local cleaning, which can achieve a reduction in cleaning fluid and an increase in cleaning efficiency.

While the present disclosure has been described with respect to the specific embodiments of the gas turbine, it will be apparent to those skilled in the art that various changes and modifications may be made without departing from the spirit and scope of the disclosure as defined in the following claims.

What is claimed is:

1. A gas turbine comprising:
a rotational body comprising a tie rod, a plurality of rotor disks arranged in an axial direction of the tie rod, and a plurality of blades radially arranged on an outer periphery of each of the rotor disks;
a stationary body surrounding the rotational body and defining a working fluid flow space between opposing surfaces of the rotational body and the stationary body, the stationary body comprising a casing for accommodating the rotational body and a plurality of vanes and diaphragms arranged on an inner surface of the casing, the vanes arranged alternately with the blades; and
a compressor cleaner disposed at a plurality of compressor positions in the stationary body and configured to spray a cleaning fluid into the working fluid flow space, the plurality of compressor positions separated from each other in the axial direction,
wherein the compressor cleaner comprises:
an injection nozzle disposed in a through-hole formed in the inner surface of the casing and having an injection port directed in the downstream direction;
a cleaning fluid passage communicating with the cleaning fluid supply source to supply the cleaning fluid to the injection nozzle; and
a cover slider disposed on the inner surface of the casing and configured to move a slidable cover disposed on the inner surface of the casing, the slidable cover moved to cover the injection port in order to open and close the injection nozzle.

2. The gas turbine according to claim 1, wherein the compressor cleaner comprises a plurality of sprayers communicating with the cleaning fluid supply source disposed externally with respect to the casing, each sprayer of the plurality of sprayers disposed at one of the plurality of compressor positions to spray the cleaning fluid in a downstream direction of the working fluid flow space from the one of the plurality of compressor positions.

3. The gas turbine according to claim 2, wherein the stationary body further comprises a center frame and a strut connected between the center frame and the inner surface of the casing, and wherein the plurality of compressor positions includes a first position located on one of the center frame and the strut.

4. The gas turbine according to claim 3, wherein the plurality of sprayers comprise:
a first sprayer disposed at the first position; and
a second sprayer disposed on the inner surface of the casing,
wherein the plurality of compressor positions includes a plurality of second positions axially separated from each other to correspond to positions interposed between the plurality of vanes, and
wherein a plurality of second sprayers are disposed at the plurality of second positions.

5. The gas turbine according to claim 4,
wherein the plurality of sprayers further comprise a third sprayer, and
wherein the plurality of compressor positions further includes a plurality of third positions axially separated from each other to correspond to positions of the plurality of vanes or diaphragms.

6. The gas turbine according to claim 5, wherein the compressor cleaner further comprises:

a controller configured to individually control a flow rate of the cleaning fluid supplied to the first, second, and third sprayers and enable entire or local cleaning of the working fluid flow space; and a hydraulic pressure regulator configured to individually measure and regulate a hydraulic pressure of the cleaning fluid supplied to the first, second, and third sprayers.

7. The gas turbine according to claim 1, wherein the cover slider comprises:
   a rotary motor disposed in the casing;
   a guide screw connected to a rotary shaft of the rotary motor; and
   a moving block having gear teeth to engage with the guide screw,
   wherein the slidable cover is connected to the moving block and configured to open and close the injection nozzle according to the movement of the moving block.

8. The gas turbine according to claim 1, wherein the compressor cleaner further comprises a nozzle seal ring disposed between an inner circumference of the through-hole and an outer circumference of the injection nozzle.

9. The gas turbine according to claim 1, further comprising:
   a diffusion filter including a plurality of diffusion windows disposed at the injection port of the injection nozzle to guide a diffusion direction of the cleaning fluid,
   wherein the injection port has an increasing flow cross-sectional area so that the cleaning fluid is diffused and sprayed into the working fluid flow space.

10. The gas turbine according to claim 1, further comprising a rotator disposed in the casing and connected to the injection nozzle, the rotator being configured to rotate the injection nozzle within a predetermined angle range in order to control an injection range of the cleaning fluid sprayed into the working fluid flow space.

11. The gas turbine according to claim 10, wherein the rotator comprises:
   a bevel gear box disposed in the casing and connected to an end of the injection nozzle; and
   a rotation motor disposed in the casing and connected to the bevel gear box.

12. A gas turbine comprising:
   a rotational body comprising a tie rod, a plurality of rotor disks arranged in an axial direction of the tie rod, and a plurality of blades radially arranged on an outer periphery of each of the rotor disks;
   a stationary body surrounding the rotational body and defining a working fluid flow space between opposing surfaces of the rotational body and the stationary body, the stationary body comprising a casing for accommodating the rotational body and a plurality of vanes and diaphragms arranged on an inner surface of the casing, the vanes arranged alternately with the blades; and
   a compressor cleaner disposed at a plurality of compressor positions in the stationary body and configured to spray a cleaning fluid into the working fluid flow space, the plurality of compressor positions separated from each other in the axial direction,
   wherein the compressor cleaner comprises:
   an injection nozzle disposed in a through-hole formed in the inner surface of the casing and having an injection port directed in the downstream direction;
   a cleaning fluid passage communicating with the cleaning fluid supply source to supply the cleaning fluid to the injection nozzle; and
   an vertical elevator disposed in the casing and connected to the injection nozzle, the vertical elevator being configured to move the injection nozzle perpendicularly with respect to the inner surface of the casing.

13. The gas turbine according to claim 12, further comprising:
   nozzle covers that are disposed at both ends of the injection nozzle and have a size corresponding to an inner peripheral surface of the through-hole; and
   a nozzle seal ring disposed between an inner surface of the through-hole and an outer surface of each of the nozzle covers.

14. The gas turbine according to claim 12, further comprising:
   a diffusion filter including a plurality of diffusion windows disposed at the injection port of the injection nozzle to guide a diffusion direction of the cleaning fluid,
   wherein the injection port has an increasing flow cross-sectional area so that the cleaning fluid is diffused and sprayed into the working fluid flow space.

15. The gas turbine according to claim 12, wherein the vertical elevator includes a hydraulic cylinder disposed in the casing and connected to the injection nozzle.

16. The gas turbine according to claim 12, further comprising a rotator disposed in the casing and connected to the injection nozzle, the rotator being configured to rotate the injection nozzle within a predetermined angle range in order to control an injection range of the cleaning fluid sprayed into the working fluid flow space.

17. The gas turbine according to claim 16, wherein the rotator comprises:
   a bevel gear box disposed in the casing and connected to an end of the injection nozzle; and
   a rotation motor disposed in the casing and connected to the bevel gear box.

18. The gas turbine according to claim 17, wherein the vertical elevator comprises:
   an elevation block in which the bevel gear box and the rotation motor are disposed;
   an elevation motor disposed in the casing;
   an elevation screw connected to a rotary shaft of the elevation motor; and
   a link arm that is disposed at an end of the elevation block and has gear teeth to engage with the elevation screw.

19. A cleaning structure for a gas turbine comprising a rotational body comprising a tie rod, a plurality of rotor disks arranged in an axial direction of the tie rod, and a plurality of blades radially arranged on an outer periphery of each of the rotor disks; and a stationary body surrounding the rotational body and defining a working fluid flow space between opposing surfaces of the rotational body and the stationary body, the stationary body comprising a casing for accommodating the rotational body and a plurality of vanes and diaphragms arranged on an inner surface of the casing, the vanes arranged alternately with the blades, the cleaning structure comprising:
   a plurality of sprayers respectively disposed at a plurality of compressor positions in the stationary body and configured to spray a cleaning fluid into the working fluid flow space, the plurality of compressor positions separated from each other in the axial direction,
   wherein each sprayer of the plurality of sprayers is disposed at one of the plurality of compressor positions to spray the cleaning fluid in a downstream direction of the working fluid flow space from the one of the plurality of compressor positions, wherein the compressor cleaner comprises:
an injection nozzle disposed in a through-hole formed in the inner surface of the casing and having an injection port directed in the downstream direction;
a cleaning fluid passage communicating with the cleaning fluid supply source to supply the cleaning fluid to the injection nozzle; and
a cover slider disposed on the inner surface of the casing and configured to move a slidable cover disposed on the inner surface of the casing, the slidable cover moved to cover the injection port in order to open and close the injection nozzle.

* * * * *